United States Patent [19]

Takahashi

[11] Patent Number: 4,799,121

[45] Date of Patent: Jan. 17, 1989

[54] DISK CARTRIDGE HAVING SHUTTERS MOVED BY A RACK AND PINION APPARATUS

[75] Inventor: Kenji Takahashi, Miyagi, Japan

[73] Assignee: Sony Corporation, Tokyo, Japan

[21] Appl. No.: 42,733

[22] Filed: Apr. 27, 1987

[30] Foreign Application Priority Data

Apr. 30, 1986 [JP] Japan ................................ 61-100043

[51] Int. Cl.$^4$ .............................................. G11B 23/03
[52] U.S. Cl. ................................... 360/133; 369/291
[58] Field of Search ................. 360/133, 99; 369/291, 369/77.2; 206/444, 312

[56] References Cited

U.S. PATENT DOCUMENTS

| | | | |
|---|---|---|---|
| 4,511,944 | 4/1985 | Saito ...................................... | 360/133 |
| 4,589,105 | 5/1986 | Nemoto et al. ................... | 360/133 X |
| 4,682,322 | 7/1987 | Ohta ................................ | 360/133 X |

FOREIGN PATENT DOCUMENTS 0066272  4/1986  Japan .................................. 360/133

*Primary Examiner*—Stuart N. Hecker
*Assistant Examiner*—David J. Severin
*Attorney, Agent, or Firm*—Hill, Van Santen, Steadman & Simpson

[57] ABSTRACT

A disk cartridge having a sliding shutter to open and close a window portion formed through a cartridge half of the disk cartridge for exposing a part of a disk accommodated in the disk cartridge, a sliding member slidably fitted to the cartridge half to support the sliding shutter relative to the disk cartridge, a first rack arranged on the sliding member, a second rack facing the rotatable pinion engageable with both of the first and second racks, and a torsion spring, one end of which is engaged with the pinion and the other end of which is engaged with the cartridge half.

5 Claims, 5 Drawing Sheets

DISK CARTRIDGE HAVING SHUTTERS MOVED BY A RACK AND PINION APPARATUS

BACKGROUND OF THE INVENTION

1. Field of the Invention

This invention relates to a disk cartridge for accomodating therein an optical disk, a magnetic disk or the like, which is provided with a dust-proof sliding shutter for a disk exposing window portion of the disc cartridge.

2. Description of the Prior Art

There has conventionally been proposed a disk cartridge provided with a dust-proof sliding shutter for a disk exposing window portion of the disk cartridge which is constructed as shown in FIGS. 1 and 2 (disclosed in Japanese Laid-open Patent Gazzette No. 58-169379).

This disk cartridge has a window portion 3 for exposing a part of a disk 2, arranged on a flat portion of a cartridge half 1 thereof, and a rail portion 4 arranged on one side edge portion of the cartridge half 1 along an external edge of the window portion 3. There is provided a dust-proof shutter 5 which moves parallelly along the rail portion 4 to open and close the window portion 3. A torsion spring 6 is stretched between one side edge 5a of the dust-proof shutter 5 and a corner portion 1a of the cartridge half 1, which spring 6 always urges the dust-proof shutter 5 by its biasing force toward the closing direction of the window portion 3, wherein the dust-proof shutter 5 is kept in its closing state by its other side edge 5b being abutting against a stopper 7 projectedly provided on the cartridge half 1 at a location corresponding to an end position of the rail 4.

In such a conventional disk cartridge constructed as mentioned above, the torsion spring , which biases the dust-proof shutter 5 toward the window portion 5, flexibly moves all over the space between the side edge 5a of the dust-proof shutter 5 and one side wall of the cartridge half 1, namely a space a in the corner portion 1a of the cartridge half 1, by opening and closing movements of the dust-proof shutter 5, so that it is impossible to provide a projected boss used for screwing and integrating the cartridge halves 1 in the space a. Accordingly, the two cartridge halves should be bonded by ultra-sonic soldering or a bonding agent. If the cartridge halves 1 are bonded as mentioned above, it becomes difficult to exchange the disk accomodated therein and further impossible to reproduce the cartridge halves.

OBJECTS AND SUMMARY OF THE INVENTION

Accordingly, it is an object of the present invention to provide a disk cartridge which is capable of reducing the amount of flexible movements of a torsion spring when a dust-proof sliding shutter is opened or closed so as to assure a space in a cartridge half for providing a projected boss.

To achieve the above object, the present invention provides a disk cartridge comprising:

(a) a sliding shutter adapted to open and close a window portion which is formed through a cartridge half constituting the disk cartridge for exposing a part of a disk accomodated in the disk cartridge;

(b) a sliding member slidably fitted to the cartridge half constituting the disk cartridge and for supporting the sliding shutter relative to the disk cartridge;

(c) a first rack provided on the sliding member;

(d) a second rack provided on the cartridge half and facing toward the first rack;

(e) a rotatable pinion arranged between the first rack and the second rack; and (f) a torsion spring one end of which is engaged with the pinion and the other end of which is engaged with the cartridge half.

These and other objects, feature and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Now, an embodiment of a disk cartridge according to the present invention will hereinafter be described with reference to FIGS. 3 through 8.

Figure 1:
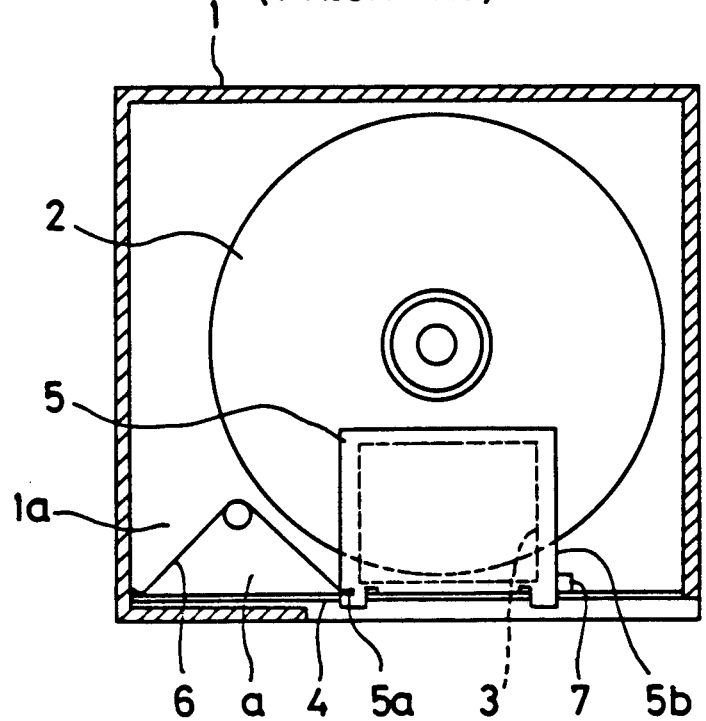
FIG. 1 is a plan cross-sectional view of a conventional disk cartridge.
Figure 2:
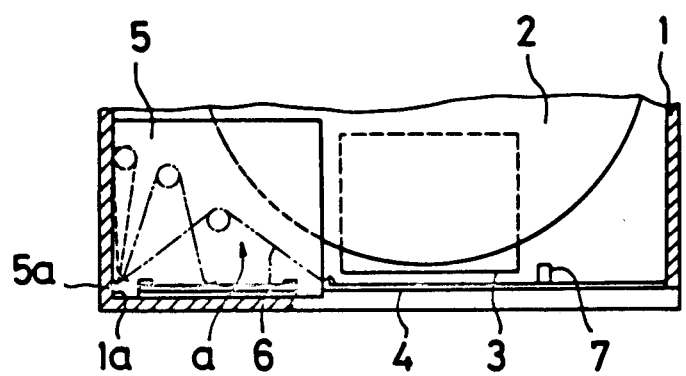
FIG. 2 is a plan cross-sectional view of a main portion of the disk cartridge of FIG. 1 when a sliding shutter opens a window portion.
Figure 3:
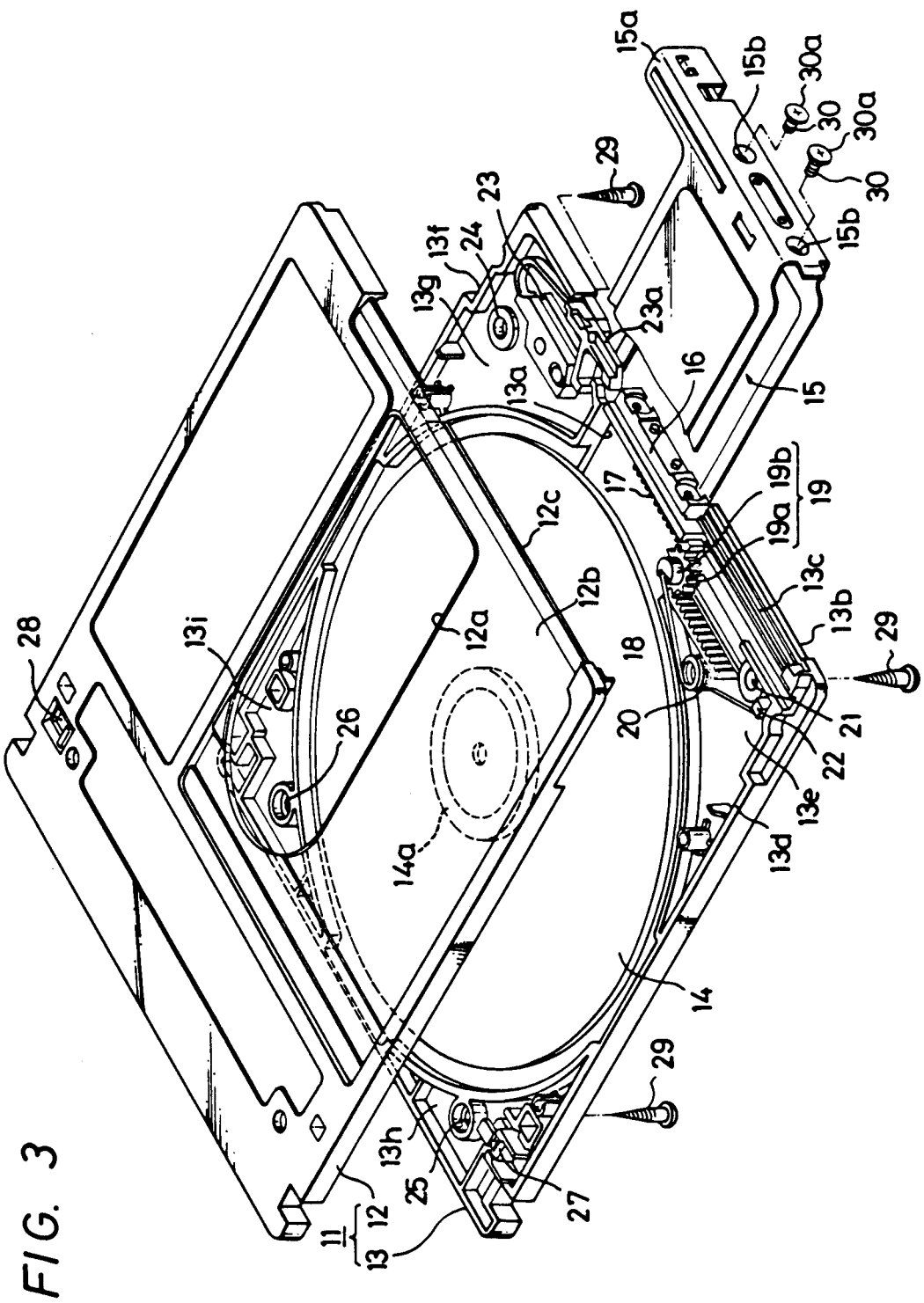
FIG. 3 is an exploded perspective view showing an embodiment of a disk cartridge according to the present invention.
Figure 4:
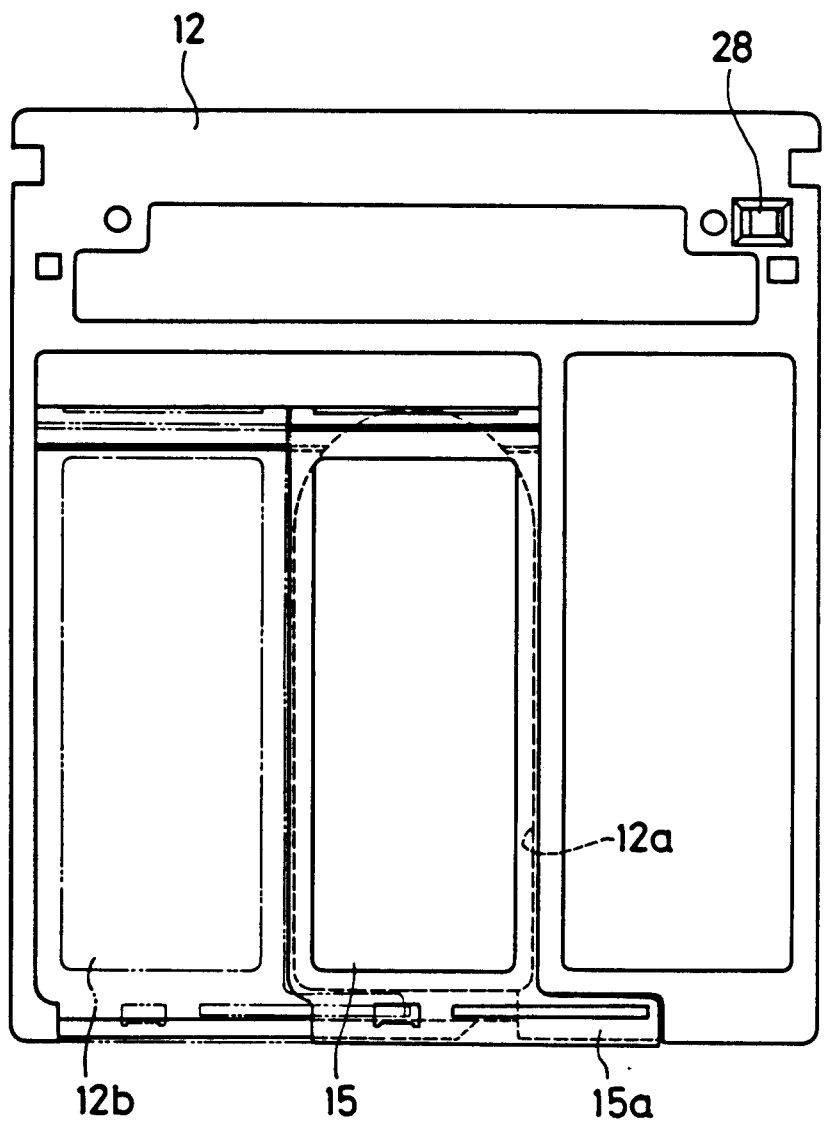
FIG. 4 is a plan view of the disk cartridge of FIG. 3.

In FIG. 3, reference numeral 11 generally designates a disk cartridge formed by an upper cartridge half 12 and a lower cartridge half 13 which are integrally coupled to each other by screws with a disk 14 accomodated therein. In a central portion of the upper and lower cartridge halves 12 and 13, there are provided window portions 12a and 13a, respectively, occupying an area from the edge portion to a portion slightly behind the center of each cartridge half. The window portions 12a and 13a expose a part of the disk 14 and a chucking hub 14a arranged in a central portion of the disk 14. On the surface sides of the cartridge halves 12 and 13, there are formed guiding plane portions 12b and 13b for a sliding shutter 15 which opens and closes the window portions 12a and 13a, over an area from one side of the window portions 12a and 13a to one side of the upper and lower cartridge halves 12 and 13. Further, there are formed, on the internal front edge surfaces of the respective guiding plane portions 12b and 13b along the lateral direction, engagement guiding grooves 12c and 13c engaged with a sliding member 16 which supports the sliding shutter 15 for the disc cartridge 11.

A first rack 17 is provided on the inner surface of the sliding member 16. On the other hand, a second rack 18 corresponding to the first rack 17 is projectedly provided in a corner portion 13e defined between the window portion 13a and a side wall 13d of the lower cartridge half 13, parallel to the guiding groove 13c. Then, a pinion 19 is rotatably engaged with the first rack 17 arranged on the sliding member 16 and the second rack 18 in a manner that the rotation of the pinion 19 and sliding of the sliding member 16 are effected relative to the second rack 18. Further, a torsion spring 20 is stretched between an eccentric portion of the pinion 19 and the corner of the corner portion 13e of the cartridge half 13 in a manner that the torsion spring 20 urges the pinion 19 by its biasing to be always rotatable in mesh with the second rack 18 to the side of the window portion 13a, whereby the sliding member 16 is slid toward the front edge of the window portion 13a.

In the movement described above, the pinion 19 rotates with respect to the second rack 18 arranged in the cartridge half 13 within a range substantially half as much as the slidable range of the sliding member 16. Therefore, the second rack 18 is projectedly arranged in the corner portion 13e toward one side wall 13d from the window portion 13a. Further outside a length necessary for rotating movements of the pinion 19, that is, in a space between the outer end of the second rack 18 and the side wall 13d, there are arranged a hole 21 for screwing the cartridge halves and adjacent thereto, at a corner of the corner portion 13e, a projected engaging portion 22 with which one end of the torsion spring 20 is engaged.

Figure 6:
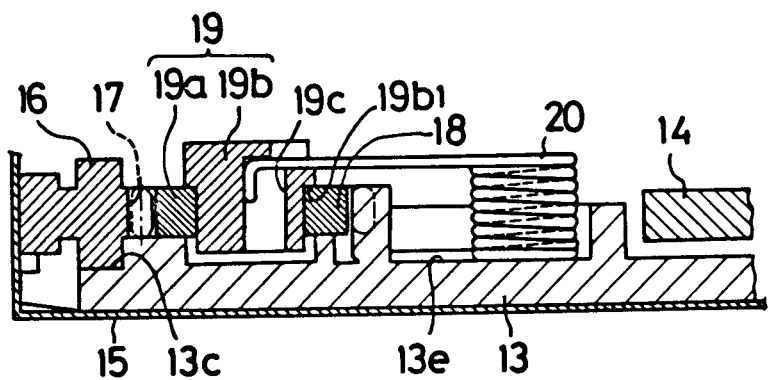
FIG. 6 is an enlarged cross-sectional view along a line A—A in FIG. 5.
Figure 7:
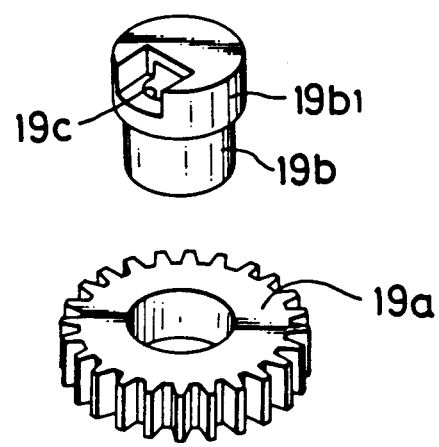
FIG. 7 is an exploded perspective view of a pinion appearing in FIG. 3.

The pinion 19 is constructed such that an outer pinion portion 19a is rotatably pivoted at a rotation axis body 19b, as shown in FIGS. 6 and 7. The rotation axis body 19b has a step portion, the step face 19$b_1$ of which supports the pinion portion 19a in the axial direction. Further, the rotation axis body 19b is provided, at its eccentric portion, with an engaging hole 19c with which the other end of the torsion spring 20 is engaged.

Turning back to FIG. 3, a locking member 23 is arranged for locking the sliding shutter 15 in a closed state in a corner portion 13g between the window portion 13a of the lower cartridge half 13 and another side wall 13f thereof. A movable locking portion 23a, which is engaged with an arm portion 15a of the sliding shutter 15, is faced to the elongated direction of the engagement guiding groove 13c. Further, at the corner portion 13g and rear corner portions 13h and 13i, there are projectedly provided holes 24, 25 and 26 for screwing the cartridge halves, respectively.

At corner portions of the upper cartridge half 12 corresponding to the corner portions 13h and 13i, there are provided erroneous recording preventing mechanisms 27 and 28, respectively.

The upper and lower cartridge halves 12 and 13 thus constructed and with the disk 14 accomodated therein are made integral by screws 29 which are inserted from the lower cartridge half 13 through holes 21, 24, 25 and 26 respectively arranged at the corner portions 13e, 13g, 13h and 13i and screwed into the other cartridge half 12. The sliding shutter 15 is mounted on the guiding plane portions 12b and 13b of the cartridge halves 12 and 13 in a manner that the sliding shutter 15 corresponds to the window portions 12a and 13a and then secured, by screws 30, to the front surface of the sliding member 16 engaged with the guiding grooves 12c and 13c between the front edges of the cartridge halves 12 and 13. Thus, the disk cartridge 11 is constituted.

Figure 8:
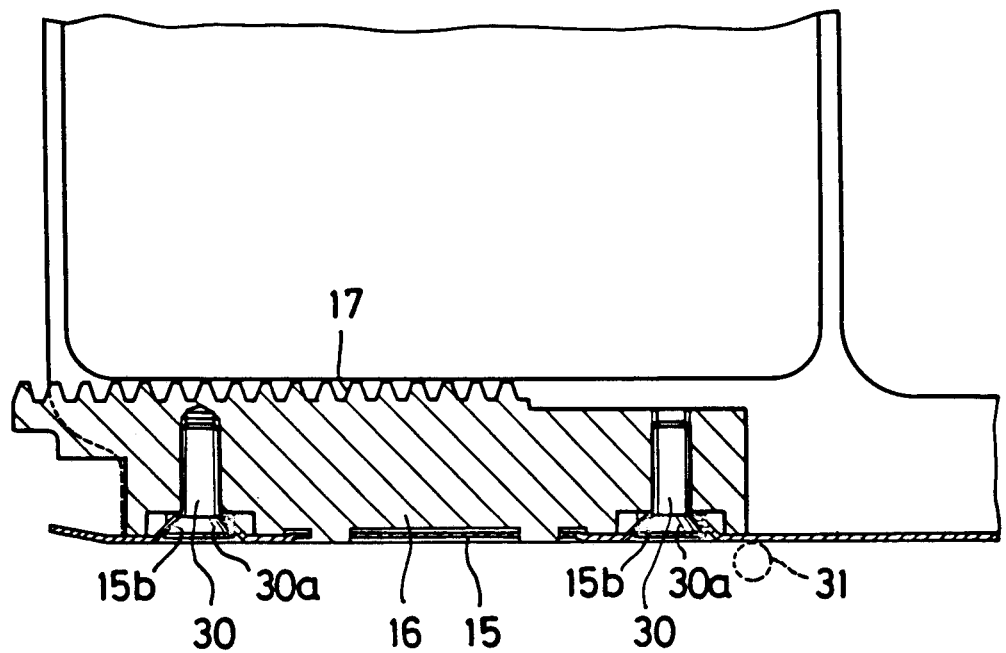
FIG. 8 is a cross-sectional view in which the sliding shutter is secured to the sliding member.

According to the present embodiment, as shown in FIG. 8, counter sunk bolts are used for the screws 30 which secures the sliding shutter 15 to the sliding member 16. A through-hole 15b bored through the side shutter 15 is formed as a counter sink, so that the head poritons 30a of each of the screws 30 is fitted into the periphery of the through hole 15b, without the head portion being projected from the front plane of the sliding shutter 15, whereby the head portions 30a of the respective screws 30 neither prevent sliding movements of a shutter loading pin 31 nor damages the aspect of the disk cartridge 11.

Further, since in the present embodiment the sliding shutter 15 is made of a metal plate, the through-hole 15b is formed as a punch-out shape by pressing.

According to the disk cartridge 11 constructed as described above, when the sliding shutter 15, is closing the window portions 12a and 13a upon non-use, the sliding member 16 is positioned at the inner end portions of the guiding grooves 12c and 13c by the pinion 19 which is biased and rotated by the spring 20, and the arm portion 15a of the sliding shutter 15 is engaged with the movable locking portion 23a of the locking member 23, so that the sliding shutter 15 is maintained in its closing state for the window portions 12a and 13a without being unnecessarily opened.

Figure 5:
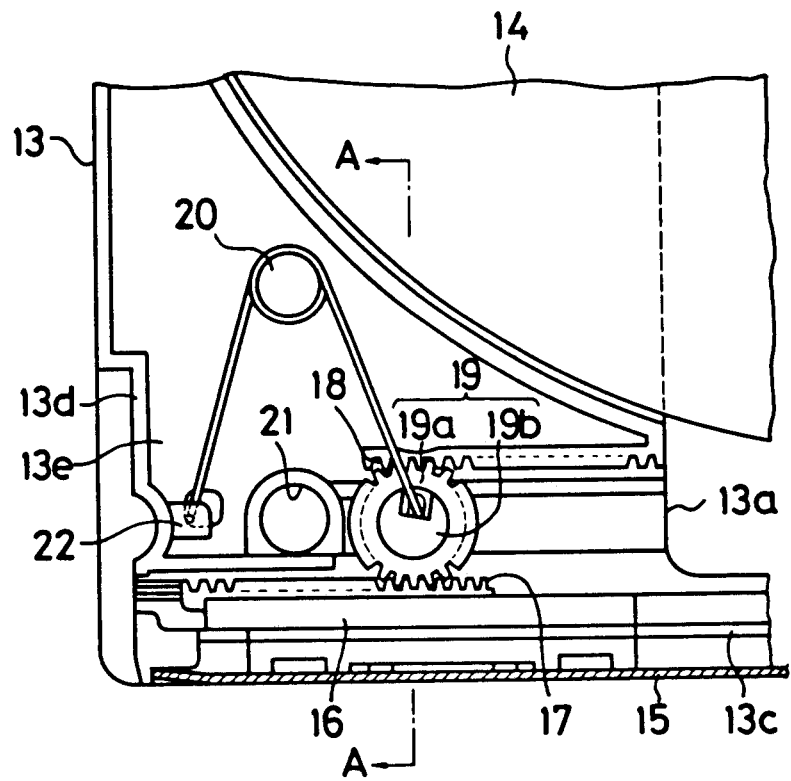
FIG. 5 is a plan view with portions in cross section showing a main portion of the disk cartridge of FIG. 3 when the sliding shutter opens the window portion.

Now, let it assumed that the disk cartridge 11 is loaded on a recording/reproducing apparatus, not shown and then driven. Then, the shutter loading pin 31 is slid on the front plane of the sliding shutter 15 to release the sliding sutter 15 from a locked state maintained by the locking member 23 and urge the same in its opening direction. Therefore, as shown in FIG. 5, the sliding member 16 is slid along the guiding grooves 12c and 13c of the cartridge halves 12 and 13, whereby the pinion 19 rotates and moves relative to the second rack 18, against the biasing force of the torsion spring 20, and consequently the torsion spring 20 moves in the corner portion 13e while being flexed. In this case, since the outer pinion portion 19a rotates relative to the central rotation axis body 19b engaged with the torsion spring 20, the pinion 19 smoothly rotates with respect to the first and second racks 17 and 18. Then, when the sliding shutter 15 is slid to such an extent that the window portions 12a and 13a are completely opened, the sliding member 16 is slid to and stopped at the outer end portion of the guiding grooves 12c and 13c. In this condition wherein the window portions 12a and 13a are fully opened, since the pinion 19 rotates by no more than substantially half of the slidable stroke of the sliding member 16, the torsion spring 20 flexibly moves to a substantially central portion of the corner portion 13e as shown in FIG. 5. Consequently, the torsion spring 20 never traverses the hole 21 arranged in an outer portion of the corner portion 13e, that is, a screwed position of the cartridge halves.

Therefore, the upper and lower cartridge halves 12 and 13 can be incorporated by screws at each corner thereof without any troubles.

As described above, according to the present invention, the rack-pinion mechanism, the stroke of which is substantially half as much as the slidable range of the sliding shutter for opening and closing the window portions of the disk cartridge, is used and one end of the torsion spring is engaged with the pinion so as to give the sliding shutter the biasing force in the closing direction for the window portions, so that it is possible to reduce the area necessary for flexible movements of the torsion spring upon the opening and closing movements of the sliding shutter and hence assure a sufficient space for a screw in the corner. Consequently, screws can be used to incorporate the cartridge halves, producing such effects that the disk accomodated therein can be easily exchanged even after assembling the disk cartridge as well as the disk cartridges can be again used.

Incidentally, in the construction of the disk cartridge described above, the cartridge halves 12 and 13, window portions 12a and 13a and sliding shutter 15 are not limitatively shaped as shown in the drawings. Further, the construction of other members neither is limited to the present embodiment and can be modified without departing from the spirits or scope of the novel concepts of the present invention.

I claim as my invention:

1. A disk cartridge comprising a pair of cartridge halves forming said cartridge, at least one cartridge half having a window portion for exposing a part of a disk accommodated in said disk cartridge, a sliding shutter adapted to open and close said window portion, a sliding member slidably fitted to said one disk cartridge half and for supporting said sliding shutter for movement relative to said disk cartridge, a first rack provided on said sliding member, a second rack provided on a cartridge half and facing said first rack, a rotation axis body having a step face and an engaging hole, a rotatable pinion being arranged on the axis body and supported by said step face in the axial direction, said pinion and body being positioned in the cartridge with the pinion being between said first rack and said second rack, and a torsion spring having one end engaged with said engaging hole and the other end being engaged with said cartridge half to urge the axis body and pinion along the second rack.

2. A disk cartridge according to claim 1, wherein each cartridge half has an opening portion closable by a sliding shutter, said shutters being mounted on said sliding member.

3. A disk cartridge as claimed in claim 1, further comprising a locking means which locks said sliding shutter at a position whereat said sliding shutter closes the window portion.

4. A disk cartridge as claimed in claim 1, wherein a disk chucking hub is also exposed through said window portion.

5. A disk cartridge as claimed in claim 4, wherein said window portion is respectively provided through each of upper and lower cartridge halves.

* * * * *